United States Patent Office 3,390,201
Patented June 25, 1968

3,390,201
PROCESS FOR THE PRODUCTION OF
DIMETHYLBUTENES
Ernest H. Drew, Baton Rouge, La., assignor to Esso Research and Engineering Company, a corporation of Delaware
No Drawing. Filed Aug. 1, 1966, Ser. No. 571,658
8 Claims. (Cl. 260—676)

ABSTRACT OF THE DISCLOSURE

This specification discloses a process for the preparation of dimethylbutenes and dimethylbutanes. A propylene containing gas is dimerized in the presence of a catalyst comprising a metal acetylacetonate, an alkyl aluminum halide and a phosphine. The butene dimers can be hydrogenated to obtain the corresponding butanes.

This invention relates to a process for the preparation of dimethyl butenes. More particularly the invention relates to the dimerization of propylene with certain catalyst mixtures or complexes whereby about 90% of the propylene is converted to $C_6$ olefins and at least 10% of the olefins are dimethylbutenes. In a preferred embodiment the invention includes hydrogenation of the dimethylbutenes to produce a high octane gasoline component.

Over the last five years the octane ratings of gasolines marketed by the major United States refiners has been steadily increasing. The average Research Octane Number of regular grade gasoline is now about 93.8 and the average research octane number of premium grade gasoline is now about 100. Gasolines are blends and some of the components having the highest octane number are prepared by alkylation and polymerization. Polymerization usually involves combining isobutylene and butylene to form a $C_8$ olefin polymer. Alkylation usually involves combining butylene or isobutylene with isobutane to produce isooctane. It would be more advantageous to the refiner to use a more plentiful and less expensive base material for the preparation of high octane components.

I have found that propylene can be dimerized to a $C_6$ olefin mixture containing at least 10% dimethylbutenes, i.e., 2,3-dimethyl-1-butene and 2,3-dimethyl-2-butene. These materials are hydrogenated to high octane alkanes. 2,3-dimethylbutane has a Research Octane number of 103.5 and is obviously an excellent blending component.

Generally speaking the invention involves preparing the catalyst mixture or complex, passing a propylene containing gas into contact with the catalyst at reaction conditions and recovering the desired products. The dimethylbutenes can then be hydrogenated. Any suitable reactor can be used for the reaction and no special contacting or handling equipment is required. The propylene containing gas can contain from 10 to 100 vol. percent propylene, preferably 70 to 100 vol. percent propylene. Reaction temperatures of —60 to 100° F. are suitable and a temperature range of 20 to 100° F. is preferred. Pressure can range from 0 to 500 p.s.i.g. and a range of 0 to 100 p.s.i.g. is preferred. Propylene rates of up to 11 kg. $C_3H_6$ per gram of metal in the catalyst are suitable. The reaction is carried out continuously or batchwise as desired. A solvent medium is used and inert organic polar solvents are preferred. Suitable solvents include aliphatic and aromatic hydrocarbons and halogenated aliphatic and aromatic hydrocarbons containing 5–12 carbon atoms per molecule. Specific examples include benzene, toluene, xylenes, ethyl benzene, chlorobenzene, bromobenzene, chlorotoluene, methylene chloride, pentane, hexane, heptane, etc.

The first catalyst forming component is a metallo acetylacetonate, selected from the group consisting of nickel acetylacetonate, iron acetylacetonate and cobalt acetylacetonate. This component is present in the catalyst mixture in an amount 5–40 wt. percent based on total catalyst.

The second catalyst component is an alkyl aluminum halide having the general formula $AlR_nX_{3-n}$ where $n$ has a value of from 1 to 2. Particularly suitable materials include $Et_2AlCl$, $EtAlCl_2$ and mixtures of these as well as bromine substantituted halides, e.g., $Et_2AlBr$ and $EtAlBr_2$. The alkyl group can contain from 1–6 carbon atoms. This component is present in the catalyst mixture in an amount 38–85 wt. percent based on total catalyst.

The third catalyst component is a phosphine having the general formula $R_3P$ wherein R is selected from the group consisting of alkyl radicals having up to 10 carbon atoms and cycloalkyl radicals having up to 10 carbon atoms. This component is present in the catalyst mixture in an amount 5–40 wt. percent based on total catalyst.

Without wishing to be bound by any particular theory, it is felt that the following remarks explain the functional characteritsics of the catalyst complex.

When the alkyl aluminum halide is added to nickel acetylacetonate a cocomplex is formed in which there is believed to be an interchange of ligands. Accompanied with this interchange is a reduction in the valence state of nickel. This complex is quite active in the dimerization of propylene. The promoter, propylene, or compounds such as cyclooctadiene, is present merely to help stabilize this reduced cocomplex. One may obtain an active catalyst in its absence. The phosphine, in addition to giving stability to the complex, influences the selectivity to various $C_6$ isomers. As the basicity increases, triphenylphosphine<tributylphosphine<tricyclohexylphosphine, the selectivity to 2,3-dimethylbutene increases. With this particular catalyst system, it is not known whether propylene is coordinated to the nickel atom through a simple carbon double bond π-complex or in some other way.

The following examples bring out various aspects of the process.

EXAMPLE 1

A solution of 0.13 gram of nickel (II) acetylacetonate and 0.11 gram of tributyl phosphine in 200 milliliters of chlorobenzene was added to a 2-liter glass flask equipped with stirrer, cooling coil, thermowell and a gas inlet tube projecting below the liquid surface. Four liters of propylene was introduced into the flask at 46° F. followed by 1.6 milliliters of 20% $Et_2AlCl$ solution in hexane and 1.7 milliliters of 20% $EtAlCl_2$ in hexane. These steps form the catalyst complex. Propylene was again introduced at atmospheric pressure at rates as high as 11 klograms of propylene per gram of nickel (metal) in the catalyst complex. The temperature of the flask was maintianed at 59–63° F. Upon termination of the run 1153 kilograms of $C_6-C_{12}$ olefin product was obtained for a catalyst efficiency of 38,000 grams of product per gram of nickel. The selectivity to $C_6$ olefins was 85% and the product distribution was 69% methyl pentenes, 11% n-hexenes and 20% 2,3-dimethylbutenes. This example demonstrates operation of the process at atmospheric pressures.

The runs tabulated below were conducted in an autoclave at 20–40 p.s.i.g. Table I discloses the results of propylene dimerization with a nickel acetylacetonate containing complex.

TABLE I.—PROPYLENE DIMERIZATION WITH NICKEL CONTAINING COMPLEX

| Run | 1 | 2 | 3 | 4 | 5 |
|---|---|---|---|---|---|
| Ni(acac)$_2$, g | 0.26 | 0.26 | 0.26 | 0.26 | 0.26 |
| Promoter, g | 0.11 COD* | 0.11 COD | 0.11 COD | 0.11 COD | 0.11 COD |
| Modifier, g | 0.21 TBP* | None | 0.18 EOP* | 0.20 HMPA* | 0.21 TBP |
| Et$_2$AlCl (20% in Hexane), ml | 6.35 | 6.35 | 6.35 | 6.35 | 0.91 |
| EtAlCl$_2$ (20% in Hexane), ml | 6.75 | 6.75 | 6.75 | 6.75 | 3.97 |
| Solvent | Toluene | Toluene | Toluene | Toluene | Toluene |
| Propylene Reacted, g | 40 | 42 | 46 | 59 | 59 |
| Rate, g. C$_3^=$/hr | 62.4 | 166 | 103 | 78.0 | 40.2 |
| Pressure, p.s.i.g. | 40 | 40 | 40 | 40 | 40 |
| Temperature, °F | 75–78 | 85–90 | 85 | 75 | 70 |
| Al/Ni | 14 | 14 | 14 | 14 | 5 |
| Results: | | | | | |
| Selectivity to C$_6$, percent | 90.4 | 88.1 | 91.6 | 91.7 | 93.8 |
| Distribution, percent: | | | | | |
| 4-Me-1-pentene | 1.2 | 0.5 | 0.8 | 0.4 | 0.7 |
| 2,3-diMe-1-butene [1] | 14.0 | 0.3 | 10.6 | 0.3 | 17.1 |
| C/T 4-Me-2-pentene | 28.9 | 6.4 | 17.3 | 6.0 | 24.7 |
| 2-Me-1-pentene | 3.5 | 5.5 | 5.8 | 6.5 | 6.7 |
| Cis-3-hexene | 2.5 | 5.3 | 2.6 | 4.9 | 2.3 |
| Trans-3-hexene | 6.6 | 13.7 | 6.7 | 12.7 | 6.0 |
| 2-Me-2-pentene | 35.0 | 58.9 | 42.6 | 59.8 | 34.3 |
| C/T-2-hexene | 1.7 | 3.9 | 1.8 | 3.7 | 1.6 |
| 2,3-diMe-2-butene | 6.5 | 5.5 | 11.8 | 5.6 | 6.6 |

| Run | 6 | 7 | 8 | 9 | 10 |
|---|---|---|---|---|---|
| Ni(acac)$_2$, g | 0.26 | 0.26 | 0.26 | 0.26 | 0.26 |
| Promoter, g | 0.11 COD | 0.11 COD | 0.11 COD | 0.15 COD | 0.15 COD |
| Modifier, g | 0.24 IPOP* | 0.21 TBP | 0.24 TBP | 0.30 TCHP* | 0.30 TCHP |
| Et$_2$AlCl (20% in Hexane), ml | None | None | 6.35 | 2.3 | 2.3 |
| EtAlCl$_2$ (20% in Hexane), ml | 4.85 | 4.85 | 6.75 | 2.4 | 2.4 |
| Solvent | Toluene | Cl-C$_6$H$_5$ | Cl-C$_6$H$_5$ | Cl-C$_6$H$_5$ | Toluene |
| Propylene Reacted, g | 42 | 59 | 63 | 41 | 12.5 |
| Rate, g. C$_3^=$/hr | 93 | 93 | 167 | 40.2 | 59 |
| Pressure, p.s.i.g. | 40 | 20 | 40 | 20 | 20 |
| Temperature, °F | 80–90 | 80–90 | 75–95 | 60–70 | 75–80 |
| Al/Ni | 5 | 5 | 14 | 5 | 5 |
| Results: | | | | | |
| Selectivity to C$_6$, percent | 74.5 | 78.5 | 86.1 | 90.9 | 94.8 |
| Distribution, percent: | | | | | |
| 4-Me-1-pentene | 1.4 | 0.4 | 0.5 | 0.7 | 0.5 |
| 2,3-diMe-1-butene [1] | | 0.9 | 5.0 | 54.8 | 31.8 |
| C/T 4-Me-2-pentene | 35.1 | 5.8 | 8.8 | 16.6 | 14.7 |
| 2-Me-1-pentene | | 2.3 | 4.7 | 10.7 | 5.7 |
| Cis-3-hexene | 5.8 | 2.4 | 2.1 | 0.6 | 0.6 |
| Trans-3-hexene | 15.2 | 6.1 | 5.3 | 1.7 | 2.0 |
| 2-Me-2-pentene | 32.7 | 54.7 | 52.1 | 7.7 | 19.6 |
| C/T-2-hexene | 4.0 | 1.8 | 1.6 | 0.5 | 0.5 |
| 2,3-diMe-2-butene | 5.7 | 25.5 | 10.9 | 6.5 | 24.6 |

See footnotes at end of Table II.

Table II discloses the results of propylene dimerization with cobalt acetylacetonate and iron acetylacetonate.

TABLE II.—PROPYLENE DIMERIZATION WITH COBALT AND IRON CONTAINING COMPLEX

| Run No | 11 | 12 | 13 | 14 | 15 |
|---|---|---|---|---|---|
| Metal Acetylacetonate, g | 0.36 Co | 0.36 Co | 0.36 Co | 0.36 Co | 0.35 Fe |
| Promoter, g | C$_3^=$ | C$_3^=$ | C$_3^=$ | C$_3^=$ | C$_3^=$ |
| Modifier, g | None | 0.26 TPP* | 0.22 TBP* | 0.22 TBP | None |
| Et$_2$AlCl (20% in Hexane), ml | 6.0 | 6.0 | 6.0 | 6.0 | 6.0 |
| EtAlCl$_2$ (20% in Hexane), ml | 6.8 | 6.8 | 6.8 | 6.8 | 6.8 |
| Solvent | C.-C$_6$H$_5$ | Cl-C$_6$H$_5$ | Cl-C$_6$H$_5$ | Toluene | Cl-C$_6$H$_5$ |
| Propylene Reacted, g | 20 | 27 | 20 | 14 | 17 |
| Rate, g. C$_3^=$/Hr | 1.1 | 3.5 | 4.2 | 0.7 | |
| Pressure, p.s.i.g. | 40 | 40 | 40 | 40 | 40 |
| Temperature, °F | 72 | 72 | 73 | 73 | 73 |
| Al/Ni Ratio | 14 | 14 | 14 | 14 | 14 |
| Results: | | | | | |
| Selectivity to C$_6$, percent | 83 | 95.7 | 92.6 | 89.1 | 87.5 |
| Distribution, percent: | | | | | |
| 4-Me-1-pentene | 3.4 | 0.9 | 2.8 | 4.8 | Neglected |
| 2,3-diMe-1-butene [1] | | 4.3 | 24.1 | 10.4 | |
| C/T 4-Me-2-pentene | 57.1 | 22.6 | 33.0 | 44.9 | 67.9 |
| 2-Me-1-pentene | | 5.5 | 6.1 | 1.6 | |
| Cis-3-hexene | 6.2 | 5.1 | 2.3 | 3.8 | 4.5 |
| Trans-3-hexene | 18.1 | 13.8 | 6.3 | 12.3 | 17.9 |
| 2-Me-2-pentene | 9.7 | 41.1 | 18.6 | 13.7 | 4.0 |
| C/T-2-hexene | 4.5 | 3.9 | 1.9 | 3.8 | 5.0 |
| 2,3-diMe-2-butene | 1.1 | 2.7 | 3.9 | 4.5 | 0.6 |

[1] Both 2,3-diMe-1-butene and cis-4-Me-2-pentene are under the same G.C. peak. This percent represents the amount after subtracting 15.5% of the t-4-Me-2-pentene G.C. peak area representing the cis-4-Me-2-pentene fraction.
*COD=1,5-cyclooctadiene.
 TBP=tributyl phosphine.
 EOP=triethyl phosphite.
 HMPA=hexamethyl phosphoramide.
 IPOP=triisopropy. phosphite.
 TCHP=tricyclohexyl phosphine.
 TPP=triphenyl phosphine.

Table III discloses the effect of varying the type of phosphine, solvent and aluminum alkyl.

TABLE III.—EFFECT OF VARYING PROCESS MATERIALS

EFFECT OF MODIFIERS

| Catalyst | Nickel Acetylacetonate Al₂Et₃Cl₃, Cyclooctadiene [1] | | |
|---|---|---|---|
| Modifier | None [2] | Bu₃P | (C₆H₁₁)₃P |
| Selectivity to C₆, percent | 88 | 91 | 91 |
| Distribution to C₆, percent: | | | |
| 2,3-dimethylbutenes | 6 | 22 | 61 |
| Methylpentenes | 71 | 68 | 36 |
| n-Hexenes | 23 | 10 | 3 |
| Conditions | 77° F. in chlorobenzene, 1–3.5 atm. pressure | | |

EFFECT OF SOLVENT

| Catalyst | Ni(acac)₂· Al₂Et₃Cl₃·COD | | | |
|---|---|---|---|---|
| Modifier | Bu₃P | | (C₆H₁₁)₃P | |
| Solvent | Toluene | Cl-Benzene | Toluene | Cl-Benzene |
| Selectivity to C₆, percent | 90 | 91 | 93 | 91 |
| Distribution of C₆, percent: | | | | |
| 2,3-dimethylbutenes | 21 | 22 | 55 | 61 |
| Methylpentenes | 68 | 68 | 42 | 36 |
| n-Hexenes | 11 | 10 | 3 | 3 |

EFFECT OF ALUMINUM ALKYL

| Catalyst | Ni(acac)₂·Al Alkyl·Bu₃P·C₃⁻ | | |
|---|---|---|---|
| Solvent | Chlorobenzene | | |
| Aluminum Alkyl | Et₂AlCl | Al₂Et₃Cl₃ | EtAlCl₂ |
| Selectivity to C₆, percent | 96 | 90 | 83 |
| Distribution of C₆, percent: | | | |
| 2,3-dimethylbutenes | 15 | 25 | 29 |
| Methylpentenes | 69 | 67 | 65 |
| n-Hexenes | 16 | 8 | 6 |

[1] Propylene may be used.
[2] Toluene.

It can be seen from Table III that tricyclohexylphosphine is very effective in directing the reaction toward the maximum production of dimethylbutenes. Additional directional effect is gained by the use of halogenated aromatic hydrocarbon solvents and dihalogenated aluminum alkyls.

Table IV demonstrates catalyst efficiency.

TABLE IV.—CATALYST EFFICIENCY

Catalyst: Ni(acac)₂·Bu₃P·Al₂Et₃Cl₃·C₃⁻ (Al/Ni=7)
Conditions: 68° F., Atmospheric Pressure

| Run | 11 | 12 |
|---|---|---|
| Throughput [1] | 5.5 | 11.0 |
| Catalyst Efficiency [2] | 26,000 | 47,000 |
| Sel. to C₆, percent | 92 | 85 |
| Distribution C₆, percent: | | |
| 4-Me-1-pentene | 0.5 | 0.7 |
| 4-Me-2-pentene | 22.2 | 22.3 |
| 2-Me-1-pentene | 6.9 | 3.6 |
| 2-Me-2-pentene | 39.2 | 42.8 |
| n-Hexenes | 9.1 | 11.0 |
| 2,3-Di-Me-1-butene | 13.2 | 6.3 |
| 2,3-Di-Me-2-butene | 8.8 | 13.3 |

[1] Kg. C₃H₆/g. Ni/hr.
[2] Molecules C₃H₆ dimerized/Ni atom.

Table IV demonstrates the high efficiency of the metal acetylacetonates employed in the catalyst. With rates as high as 11 kilograms of propylene per gram of nickel in the catalyst per hour, some 38 kilograms of propylene reacted per gram of nickel and 47,000 molecules of propylene had been dimerized per nickel atom.

Run 13.—The following run was carried out in the absence of a catalyst promoter demonstrating that a promoter is not essential.

A 300 ml. stirred glass-lined autoclave was charged with 0.26 g. nickel (II) acetylacetone, 0.22 g. tributyl phosphine in 44 ml. of chlorobenzene and 6.0 ml. of a 20% EtAlCl₂ solution in hexane. After stirring five minutes, propylene was added at a rate to maintain 20 p.s.i.g. in the reaction vessel at 70° F. Propylene was consumed at about 0.8 liter/min. After one mole of propylene was consumed the C₆ olefin distribution was:

| | Percent |
|---|---|
| Selectivity to C₆ | 71 |
| Distribution: | |
| 4-Me-1-pentene | 0.9 |
| 2,3-diMe-1-butene | 2.5 |
| C/T 4-Me-2-pentene | 11.9 |
| 2-Me-1-pentene | — |
| Cis-3-hexene | 1.6 |
| Trans-3-hexene | 3.9 |
| 2-Me-2-pentene | 50.9 |
| C/T-2-hexene | 1.4 |
| 2,3-diMe-2-butene | 26.9 |

Run 14.—In a specific embodiment of the invention, the partially spent catalyst complex of Run 11 was used as a hydrogenation catalyst. A 94-gram sample of the liquid reaction mixture was combined with 1 milliliter of 20% triisobutyl aluminum heptane solution. Hydrogen was bubbled through the reactor at a temperature of 75° F. and a pressure of 50 p.s.i.g. 14 wt. percent of the C₆ olefin products were hydrogenated to alkanes.

The dimethyl butenes can be hydrogenated with hydrogenation catalysts containing nickel, cobalt, molybdenum, platinum, iron and combinations of these on suitable support materials such as alumina, silica-alumina, molecular sieves, bauxite, clay, kieselguhr, etc. Suitable hydrogenation conditions include temperatures of 300–1000° F. and pressures of 0–1000 p.s.i.g.

The process of the present invention provides an efficient means of producing high yields of dimethyl butenes and dimethyl butanes from readily available, low cost propylene. Thus a new source of high octane gasoline components is available to the refiner.

What is claimed is:

1. A process for the preparation of dimethylbutenes comprising the steps of:
    (a) reacting a propylene containing gas in the presence of an inert organic polar solvent and catalyst complex comprising (1) 5–40 wt. percent of an organometallic component selected from the group consisting of nickel acetylacetonate, iron acetylacetonate and cobalt acetylacetonate, (2) 35–85 wt. percent of an alkyl aluminum halide having the general formula $AlR_nX_{3-n}$ wherein R is an alkyl group containing 1–6 carbon atoms, $x$ is a halogen and $n$ has a value of from 1 to 2 and (3) 5–40 wt. percent of a phosphine having the general formula $R_3P$ wherein R is selected from the group consisting of alkyl radicals having up to 10 carbon atoms and cycloalkyl radicals having up to 10 carbon atoms,
    (b) recovering a reaction product comprising olefins containing six carbon atoms, and
    (c) recovering at least 10 wt. percent of dimethyl butenes.

2. Process according to claim 1 in which 2,3-dimethylbutene compriess a major amount of the dimethyl butene product.

3. Process in which the said organometallic component is nickel acetyl aceonate and the phosphine is tricyclohexyl phosphine.

4. A process in which the solvent is a halogenated aromatic hydrocarbon.

5. A process for the preparation of a mixture of 2,3-dimethyl-1-butene and 2,3-dimethyl-2-butene comprising the steps of reacting propylene in the presence of chlorobenzene and a catalyst complex comprising 5–40 wt. percent of nickel acetylacetonate, 35–85 wt. percent of ethyl aluminum dichloride and 5–40 wt. percent of tricyclohexyl phosphine at a temperature of 20 to 100° F., recovering a reaction product containing at least 50 wt. percent of the said dimethylbutenes and separating the dimethylbutenes.

6. A process for the preparation of dimethylbutenes comprising the steps of:
   (a) reacting a propylene containing gas at a temperature in the range of 60 to 100° F. in the presence of a polar solvent containing 5–12 carbon atoms in the molecule and selected from the group consisting of aliphatic hydrocarbons, aromatic hydrocarbons, halogenated aliphatic hydrocarbons and halogenated aromatic hydrocarbons and a dimerization catalyst complex comprising:
      (1) 5–40 wt. percent of an organometallic component selected from the group consisting of nickel acetylacetonate, iron acetylacetonate and cobalt acetylacetonate,
      (2) 35–85 wt. percent of an alkyl aluminum having the general formula $AlR_nX_{3-n}$ wherein R is an alkyl group containing 1–6 carbon atoms, $x$ is a halogen and $n$ has a value of from 1 to 2, and
      (3) 5–40 wt. percent of a phosphine having the general formula $R_3P$ wherein R is selected from the group consisting of alkyl radicals having up to 10 carbon atoms;
   (b) recovering a reaction product comprising olefins containing six carbon atoms including at least 10 wt. percent dimethyl butenes,
   (c) separating dimethyl butenes,
   (d) contacting said dimethyl butenes with hydrogen and a hydrogenation catalyst at hydrogenation conditions, and
   (e) recovering dimethylbutanes.

7. Process according to claim 6 in which the hydrogenation catalyst is cobalt molybdate on alumina.

8. A process for the preparation of dimethylbutanes comprising the steps of:
   (a) reacting a propylene containing gas in the presence of a polar solvent containing 5–12 carbon atoms in the molecule and selected from the group consisting of aliphatic hydrocarbons, aromatic hydrocarbons, halogenated aliphatic hydrocarbons and halogenated aromatic hydrocarbons;
      (1) 5–40 wt. percent of an organometallic component selected from the group consisting of nickel acetylacetonate, iron acetylacetonate and cobalt acetylacetonate,
      (2) 35–85 wt. percent of an alkyl aluminum halide having the general formula $AlR_nX_{3-n}$ wherein R is an alkyl group containing 1–6 carbon atoms, $x$ is a halogen and $n$ has a value of from 1 to 2, and
      (3) 5–40 wt. percent of a phosphine having the general formula $R_3P$ wherein R is selected from the group consisting of alkyl radicals having up to 10 carbon atoms;
   (b) recovering a reaction mixture comprising olefins containing six carbon atoms including at least 10 wt. percent dimethyl butenes,
   (c) contacting the said reaction mixture with hydrogen at hydrogenation conditions whereby the used dimerization catalyst is employed as the hydrogenation catalyst, and
   (d) recovering dimethylbutanes.

References Cited
UNITED STATES PATENTS

| | | | |
|---|---|---|---|
| 3,165,557 | 1/1965 | Coover et al. | 260—683.15 |
| 2,969,408 | 1/1961 | Nowlin et al. | 260—683.15 |
| 3,139,460 | 6/1964 | Eisenmann | 260—677 |
| 3,321,546 | 5/1967 | Roest et al. | 260—683.15 |

DELBERT E. GANTZ, *Primary Examiner.*

J. D. MYERS, *Assistant Examiner.*